United States Patent
Sugahara et al.

(10) Patent No.: US 9,845,013 B2
(45) Date of Patent: Dec. 19, 2017

(54) CONTROLLER OF AC ELECTRIC VEHICLE

(75) Inventors: Tetsuo Sugahara, Tokyo (JP); Takumi Uemura, Tokyo (JP)

(73) Assignee: MITSUBISHI ELECTRIC CORPORATION, Chiyoda-Ku, Tokyo (JP)

( * ) Notice: Subject to any disclaimer, the term of this patent is extended or adjusted under 35 U.S.C. 154(b) by 582 days.

(21) Appl. No.: 14/409,396

(22) PCT Filed: Jun. 29, 2012

(86) PCT No.: PCT/JP2012/066730
§ 371 (c)(1),
(2), (4) Date: Dec. 18, 2014

(87) PCT Pub. No.: WO2014/002260
PCT Pub. Date: Jan. 3, 2014

(65) Prior Publication Data
US 2015/0191086 A1 Jul. 9, 2015

(51) Int. Cl.
*B60L 3/04* (2006.01)
*B60L 3/00* (2006.01)
(Continued)

(52) U.S. Cl.
CPC ...... *B60L 3/04* (2013.01); *B60L 3/00* (2013.01); *B60L 7/14* (2013.01); *B60L 9/005* (2013.01);
(Continued)

(58) Field of Classification Search
CPC ...... B60L 3/00; B60L 9/28; B60L 7/14; B60L 3/04; B60L 9/005; B60L 2200/26;
(Continued)

(56) References Cited

U.S. PATENT DOCUMENTS 5,677,610 A * 10/1997 Tanamachi ............... B60L 3/10
318/801
5,805,797 A * 9/1998 Sato .......................... B61L 3/008
714/48

(Continued)

FOREIGN PATENT DOCUMENTS

EP 0 216 358 A2 4/1987
EP 1 843 459 A1 10/2007
(Continued)

OTHER PUBLICATIONS

The extended European Search Report dated Mar. 16, 2016, by the European Patent Office in corresponding European Patent Application No. 12880172.7-1807. (9 pages).
(Continued)

*Primary Examiner* — Daniel Kessie
(74) *Attorney, Agent, or Firm* — Buchanan Ingersoll & Rooney PC

(57) ABSTRACT

A controller of an AC electric vehicle includes a first specific-frequency-current computation unit that extracts a current component corresponding to a first specific frequency set value from a main-transformer output current and outputs the current component as a first specific-frequency current, a subtractor that subtracts the first specific-frequency current from the main-transformer output current and outputs a subtraction result as a current deviation, a second specific-frequency-current computation unit that extracts a current component corresponding to a second specific frequency set value from the current deviation and outputs the current component as a second specific-frequency current, and a power-failure detection unit that compares the second specific-frequency current with a predetermined power-failure detection-current set value and outputs a power-failure detection signal when the second
(Continued)

specific-frequency current is larger than the power-failure detection-current set value.

10 Claims, 5 Drawing Sheets

(51) Int. Cl.
    *B60L 9/28*     (2006.01)
    *H02M 1/32*     (2007.01)
    *B60L 9/00*     (2006.01)
    *B60L 7/14*     (2006.01)
    *H02M 7/48*     (2007.01)

(52) U.S. Cl.
    CPC ................. *B60L 9/28* (2013.01); *H02M 1/32* (2013.01); *B60L 2200/26* (2013.01); *B60L 2210/20* (2013.01); *B60L 2210/30* (2013.01); *B60L 2210/40* (2013.01); *H02M 7/48* (2013.01); *Y02T 10/725* (2013.01); *Y02T 10/7241* (2013.01)

(58) Field of Classification Search
    CPC ............ B60L 2210/40; B60L 2210/20; B60L 2210/30; H02M 1/32; H02M 7/48; Y02T 10/7241
    USPC .............................. 307/10.1, 9.1; 318/400.21
    See application file for complete search history.

(56) References Cited

U.S. PATENT DOCUMENTS

| | | | | |
|---|---|---|---|---|
| 5,847,534 | A * | 12/1998 | Tanamachi | B60L 3/10 318/52 |
| 6,278,256 | B1 * | 8/2001 | Aoyama | B60L 3/003 318/801 |
| 7,808,195 | B2 * | 10/2010 | Kitanaka | B60L 7/14 290/40 C |
| 7,902,791 | B2 * | 3/2011 | Negoro | B60L 7/24 318/105 |
| 7,904,216 | B2 * | 3/2011 | Nakazawa | B60L 3/0023 318/52 |
| 8,049,455 | B2 * | 11/2011 | Kitanaka | B60L 3/003 318/563 |
| 8,269,451 | B2 * | 9/2012 | Kitanaka | B60L 3/0023 318/434 |
| 2008/0004760 | A1 | 1/2008 | Sogihara | |
| 2008/0122393 | A1 * | 5/2008 | Negoro | B60L 7/24 318/552 |
| 2010/0079093 | A1 * | 4/2010 | Kitanaka | B60L 3/003 318/400.3 |
| 2010/0176655 | A1 | 7/2010 | Yokozutsumi | |

FOREIGN PATENT DOCUMENTS

| | | | |
|---|---|---|---|
| EP | 2 181 883 | A1 | 5/2010 |
| JP | 06-046501 | A | 2/1994 |
| JP | H06-197401 | A | 7/1994 |
| JP | 09093791 | A * | 4/1997 |
| JP | 10-248102 | A | 9/1998 |
| JP | 3144848 | B2 | 3/2001 |
| JP | 4243321 | B1 | 3/2009 |
| JP | 2009095080 | A * | 4/2009 |
| JP | 2010-115018 | A | 5/2010 |
| WO | WO 2006/080046 | A1 | 8/2006 |
| WO | WO 2009/025049 | A1 | 2/2009 |

OTHER PUBLICATIONS

International Search Report (PCT/ISA/210) dated Jul. 31, 2012, by the Japanese Patent Office as the International Searching Authority for International Application No. PCT/JP2012/066730.

Written Opinion (PCT/ISA/237) dated Jul. 31, 2012, by the Japanese Patent Office as the International Searching Authority for International Application No. PCT/JP2012/066730.

Office Action (Communication pursuant to Article 94(3) EPC) dated Nov. 18, 2016, by the European Patent Office in corresponding European Patent Application No. 12880172.7. (5 pages).

* cited by examiner

CONTROLLER OF AC ELECTRIC VEHICLE

FIELD

The present invention relates to a controller of an alternating-current (AC) electric vehicle having a power failure detection function in an overhead contact line that supplies AC power (hereinafter, "AC overhead contact line").

BACKGROUND

In an AC electric vehicle that runs by transfer of power or regenerative power supplied from the AC overhead contact line, if a power failure occurs in the AC overhead contact line for any cause, it has been conventionally performed, for security reasons, to detect the power failure of the AC overhead contact line promptly (for example, within 100 to 1000 milliseconds) to stop a controller of the electric vehicle. When a power failure occurs in the AC overhead contact line while the electric vehicle is applying regenerative braking (hereinafter, "regenerative vehicle") to supply regenerative power to the AC overhead contact line, if there is no electric vehicle that performs power running by receiving supply of power from the AC overhead contact line (hereinafter, "power running vehicle") within the same substation section, or even if there is the power running vehicle, if the regenerative power supply by the regenerative vehicle does not match with consumed power consumed by the power running vehicle, a fluctuation of current and voltage occurs due to the power failure in the AC overhead contact line. Accordingly, the power failure can be detected by capturing the fluctuation of current and voltage in the AC overhead contact line. However, it has been known that when the regenerative power of the regenerative vehicle and the consumed power of the power running vehicle present in the same substation section become substantially even, a fluctuation range of current and voltage of the AC overhead contact line decreases, thereby making it difficult to detect a power failure. In the following explanations, the power failure of the AC overhead contact line in a state where the regenerative power of the regenerative vehicle and the consumed power of the power running vehicle present in the same substation section become substantially even is referred to as "balanced power failure".

Conventionally, as a technique of detecting a power failure of an AC overhead contact line, for example, there has been disclosed a technique of detecting a power failure when a current deviation exceeds a predetermined power-failure detection set value, by extracting a current component corresponding to a frequency of the AC overhead contact line (for example, 50 hertz or 60 hertz) from a detection current signal obtained by detecting, for example, an input current of a converter by a current detector, subtracting the detection current signal from an extracted specific-frequency current signal, and comparing a current deviation being a subtraction result with the predetermined power-failure detection set value (for example, Patent Literature 1). Furthermore, there has been disclosed a technique of detecting a power failure by using, for example, an input voltage of a converter, not by using an input current thereof (for example, Patent Literature 2).

CITATION LIST

Patent Literatures

Patent Literature 1: Japanese Patent No. 4243321
Patent Literature 2: Japanese Patent No. 3144848

SUMMARY

Technical Problem

As described above, when a power failure of the AC overhead contact line has occurred, it is required, for security reasons, to detect the power failure of the AC overhead contact line reliably and promptly to stop the controller of the electric vehicle. On the other hand, in the balanced power failure described above, because a fluctuation range of the current and voltage of the AC overhead contact line decreases, the power-failure detection set value needs to be set small in order to detect the balanced power failure. However, in the conventional techniques represented by the Patent Literatures mentioned above, if the power-failure detection set value is set small in order to detect a power failure having a small fluctuation range of the current and voltage of the AC overhead contact line such as the balanced power failure, as disadvantages thereof, power failure detection accuracy may decrease, thereby affecting smooth operation of the electric vehicle. For example, erroneous power failure detection may occur at the time of normal operation in which the AC overhead contact line does not have a power failure.

The present invention has been achieved in view of the above problems, and an object of the present invention is to provide a controller of an AC electric vehicle that can improve power failure detection accuracy, while increasing power failure detection sensitivity more than that in conventional techniques.

Solution to Problem

The present invention is directed to a controller of an AC electric vehicle that achieves the object. The controller includes a transformer that receives an AC voltage from an AC overhead contact line; a converter that converts an AC voltage output from the transformer to a DC voltage; an inverter that converts the DC voltage from the converter to an AC voltage and outputs the AC voltage to an AC electric motor; a current detector that detects an output current from the transformer; and a control unit including a converter control unit that controls an output of the converter according to a gate enable signal based on a detection current detected by the current detector and a power failure detector that detects a power failure generated in the AC overhead contact line based on the detection current.

The power failure detector includes a first specific-frequency-current computation unit that extracts a current component corresponding to a predetermined first specific frequency set value from the detection current and outputs the extracted current component as a first specific-frequency current; a subtractor that subtracts the first specific-frequency current from the detection current and outputs a subtraction result as a current deviation; a second specific-frequency-current computation unit that extracts a current component corresponding to a predetermined second specific frequency set value from the current deviation and outputs the extracted current component as a second specific-frequency current; and a power failure detector that compares the second specific-frequency current with a predetermined power-failure detection-current set value, and outputs a power-failure detection signal when the second specific-frequency current is larger than the power-failure detection-current set value.

The converter control unit stops an operation of the converter by stopping the gate enable signal based on the input power-failure detection signal.

Advantageous Effects of Invention

According to the present invention, in the controller of an AC electric vehicle having a power failure detection function in an AC overhead contact line that supplies AC power, power failure detection accuracy can be improved, while increasing power failure detection sensitivity more than that in conventional techniques.

DESCRIPTION OF EMBODIMENTS

Exemplary embodiments of a controller of an AC electric vehicle according to the present invention will be explained below in detail with reference to the accompanying drawings. The present invention is not limited to the embodiments.

First Embodiment

Configuration of AC Electric Vehicle

Figure 1:
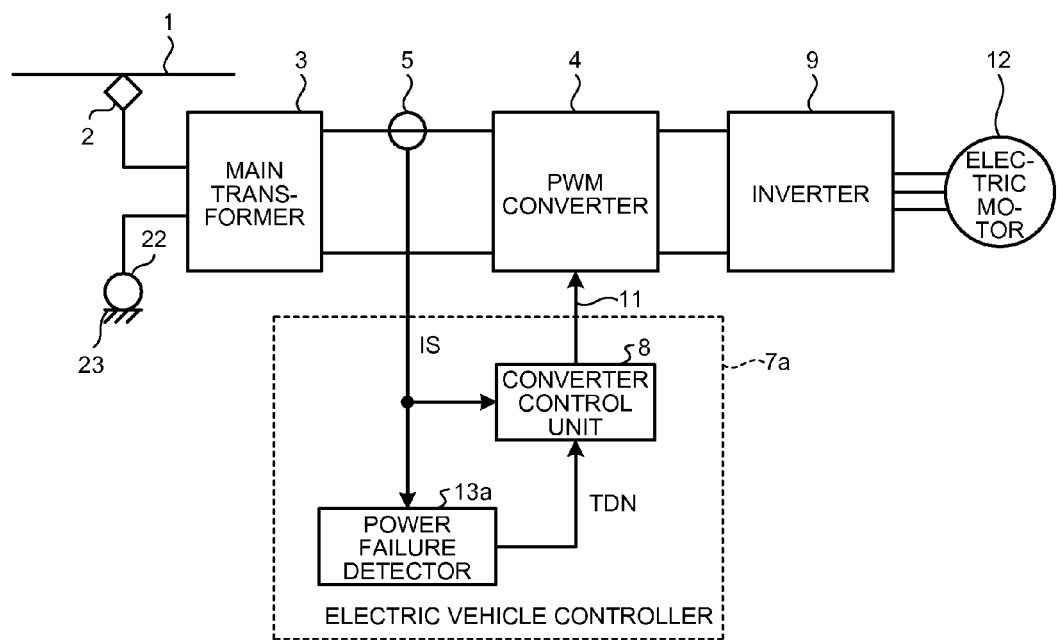
FIG. 1 shows a configuration example of a drive system and a control system of an AC electric vehicle according to a first embodiment.

FIG. 1 shows a configuration example of a drive system and a control system of an AC electric vehicle according to a first embodiment. In FIG. 1, the drive system of the AC electric vehicle is configured to include a main transformer 3 that receives AC power as an input, a PWM converter 4 that receives an AC output of the main transformer 3 as an input, an inverter 9 that receives a direct-current (DC) output of the PWM converter 4 as an input, and one or more electric motors 12 driven by the AC output of the inverter 9. As the electric motor 12, an induction motor or a synchronous motor is suitable.

Meanwhile, the control system of the AC electric vehicle is configured to include a current detector 5 that detects an output current of the main transformer 3, and an electric vehicle controller 7a that controls the PWM converter 4 based on a main-transformer output current IS being an output of the current detector 5. The electric vehicle controller 7a includes a converter control unit 8 and a power failure detector 13a, and is configured so that the main-transformer output current IS is input to both the converter control unit 8 and the power failure detector 13a.

One end of the main transformer 3 on a primary side is connected to an AC overhead contact line 1 via a pantograph 2, and the other end is connected to a rail 23 having a ground potential via wheels 22. That is, it is configured such that transmitted power from a substation (not shown) is received via the AC overhead contact line 1, the pantograph 2, the wheels 22, and the rail 23.

Operation of AC Electric Vehicle

An operation of the AC electric vehicle is explained, while dividing the operation into normal operation (at the time of a non-power failure) at which a power failure has not occurred in the AC overhead contact line and operation at the time of detection of a power failure when the power failure has occurred.

(Normal Operation)

The normal operation (at the time of having no power failure) is explained first. When AC power collected from the AC overhead contact line 1 via the pantograph 2 is supplied to the main transformer 3, the main transformer 3 outputs a stepped-down AC voltage to the PWM converter 4. The PWM converter 4 converts the input AC voltage to a desired DC voltage, and outputs the converted DC voltage to the inverter 8. Meanwhile, the current detector 5 outputs the main-transformer output current IS output from the main transformer 3 to the converter control unit 8 and the power failure detector 13a of the electric vehicle controller 7a. The converter control unit 8 controls an output of a gate enable signal 11 for maintaining the DC voltage generated by the PWM converter 4 at a constant value based on the main-transformer output current IS. That is, an output level of the DC voltage output from the PWM converter 4 to the inverter 9 is controlled by the gate enable signal 11 output from the converter control unit 8. The inverter 9 converts the input DC voltage to an AC voltage of a desired frequency and a desired voltage and outputs AC voltage to the electric motor 12. The electric motor 12 controls running of the electric vehicle by using the input AC voltage.

At the time of power running of the electric vehicle (at the time of controlling acceleration), the electric motor 12 is accelerated by performing power conversion described above. However, at the time of braking (at the time of deceleration), the electric motor 12 is operated as a generator. At this time, the inverter 9 performs converter operation, and the PWM converter 4 performs inverter operation to apply AC power regenerative braking.

(Operation of Detecting Power Failure at the Time of Occurrence of Power Failure)

An operation of detecting a power failure at the time of occurrence of the power failure is explained next. However, the reason why detection of a power failure needs to be performed reliably and promptly is explained first. A case where a breaker of a substation is turned off due to an accident in a ground facility or the like, that is, a case where a power failure of the AC overhead contact line 1 has occurred is considered here. At this time, in a balanced power failure in which there are a regenerative vehicle and a power running vehicle in a substation section in which a power failure of the AC overhead contact line 1 has occurred, and regenerative power supplied by the regenerative vehicle and power consumption consumed by the power running vehicle become substantially even, it is difficult to detect a power failure, because the fluctuation range of the voltage and current of the AC overhead contact line becomes small.

When a power-failure detection set value is set small in order to detect a power failure having a small fluctuation range of the voltage or current of the AC overhead contact line 1 such as the balanced power failure, as disadvantages thereof, power failure detection accuracy may decrease, thereby affecting smooth operation of the electric vehicle. For example, erroneous power failure detection may occur at the time of normal operation in which the AC overhead contact line does not have a power failure. Meanwhile, it can be considered to change and set the power-failure detection set value to a value that decreases a probability of the erroneous detection. However, in this case, power failure detection may be delayed at the time of interrupting a feeding circuit, and an excessive current may flow into the ground facility such as the substation according to conditions, thereby causing a failure of the device. Therefore, power failure detection needs to be performed reliably in a short time of, for example, 100 to 1000 milliseconds to stop regenerative braking operation immediately.

As described above, if it is attempted to prevent erroneous detection of a power failure, the power failure detection sensitivity decreases and delay occurs in the power failure detection. On the other hand, if it is attempted to increase the power failure detection sensitivity to increase the power failure detection speed, the power failure detection accuracy cannot be maintained. In conventional techniques, control to satisfy both of these points cannot be executed. However, in the controller according to the present embodiment, control to satisfy both of improvement of the power failure detection sensitivity and improvement of the power failure detection accuracy can be performed.

Referring back to FIG. 1, when a power failure of the AC overhead contact line 1 has occurred, a power-failure detection signal TDN is output from the power failure detector 13*a* to the converter control unit 8. The power-failure detection signal TDN is generated by using the main-transformer output current IS detected by the current detector 5. The converter control unit 8 completely stops the output of the gate enable signal 11 based on the input power-failure detection signal TDN.

(Detailed Configuration of Power Failure Detector)

Figure 2:
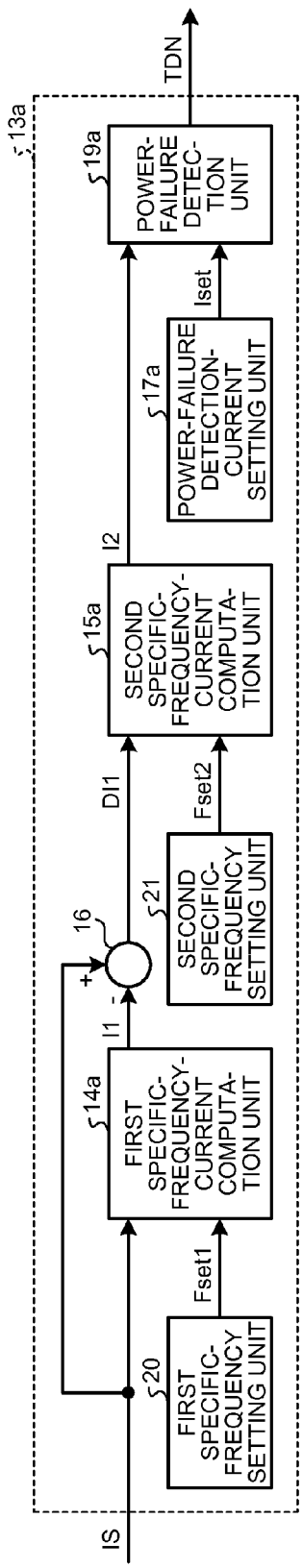
FIG. 2 shows an example of a detailed configuration of a power failure detector according to the first embodiment.

A configuration of the power failure detector 13*a* according to the first embodiment is explained next. FIG. 2 shows an example of a detailed configuration of the power failure detector according to the first embodiment.

In FIG. 2, the power failure detector 13*a* includes a first specific-frequency setting unit 20 that outputs a set value expressing a first specific frequency (hereinafter, "first specific frequency set value") Fset1, and a second specific-frequency setting unit 21 that outputs a set value expressing a second specific frequency (hereinafter, "second specific frequency set value") Fset2. The power failure detector 13*a* further includes a power-failure detection-current setting unit 17*a* that outputs a power-failure detection-current set value Iset, which is a threshold for determining a power failure by a current value level, a first specific-frequency-current computation unit 14*a* that receives the main-transformer output current IS and the first specific frequency set value Fset1 as an input, a subtractor 16 that receives the main-transformer output current IS and a first specific-frequency current I1 being an output of the first specific-frequency-current computation unit 14*a* as an input, a second specific-frequency-current computation unit 15*a* that receives a current deviation DI1 being an output of the subtractor 16 and the second specific frequency set value Fset2 as an input, and a power-failure detection unit 19*a* that receives the power-failure detection-current set value Iset and a second specific-frequency current I2 being an output of the second specific-frequency-current computation unit 15*a* as an input. An output of the power-failure detection unit 19*a* is output as the power-failure detection signal TDN.

The first specific frequency set value Fset1 output by the first specific-frequency setting unit 20, the second specific frequency set value Fset2 output by the second specific-frequency setting unit 21, and the power-failure detection-current set value Iset output by the power-failure detection-current setting unit 17*a* can be set to an arbitrary value, respectively, according to a usable frequency in a feeding facility such as a substation, that is, a power source frequency and supplied power of the AC overhead contact line 1, the number of vehicles in the formation to be operated simultaneously, the train formation type, and the like. A power source frequency of the AC overhead contact line 1 (for example, 60 hertz) only needs to be set as the first specific frequency set value Fset1, and a particular frequency generated at the time of a balanced power failure (for example, 120 hertz being double frequency of the power source frequency of the AC overhead contact line 1) only needs to be set as the second specific frequency set value Fset2, and a different value can be set to the main-transformer output current IS or the current deviation DI1.

As the first specific-frequency-current computation unit 14*a* and the second specific-frequency-current computation unit 15*a*, as an example thereof, a bandpass filter respectively using the first specific frequency set value Fset1 and the second specific frequency set value Fset2 as a central frequency can be considered.

(Operation of Power Failure Detector)

The operation of the power failure detector 13*a* is explained with reference to FIGS. 1 and 2. The first specific-frequency-current computation unit 14*a* extracts a current component corresponding to the first specific frequency set value Fset1 from the main-transformer output current IS output from the current detector 5, and outputs the current component to the subtractor 16 as the current deviation DI1. The subtractor 16 subtracts the first specific frequency set value Fset1 from the main-transformer output current IS, and outputs a subtraction result to the second specific-frequency-current computation unit 15*a* as the current deviation DI1. The second specific-frequency-current computation unit 15*a* extracts a current component corresponding to the second specific frequency set value Fset2 from the current deviation DI1, and outputs the current component to the power-failure detection unit 19*a* as the second specific-frequency current I2.

Figure 3:
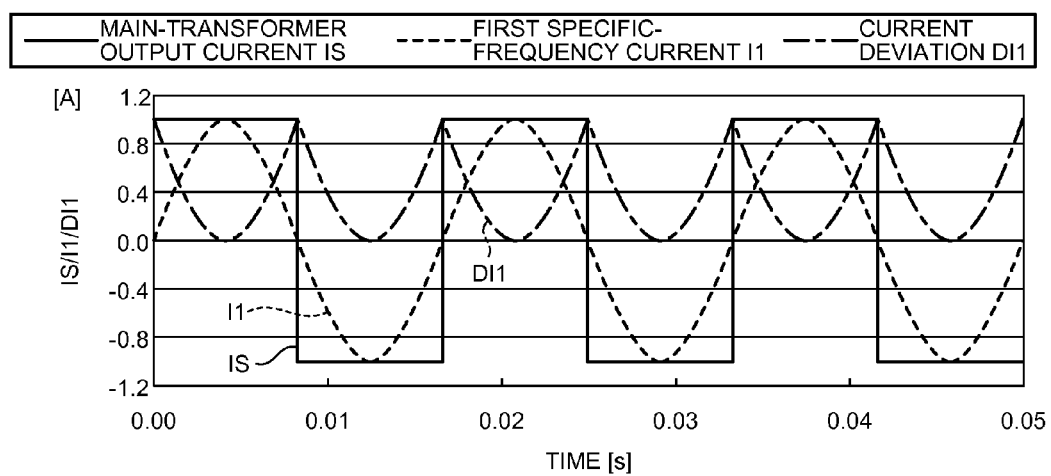
FIG. 3 shows respective waveforms of a main-transformer output current IS, a first specific-frequency current I1, and a current deviation DI1 at the time of a balanced power failure.
Figure 4:
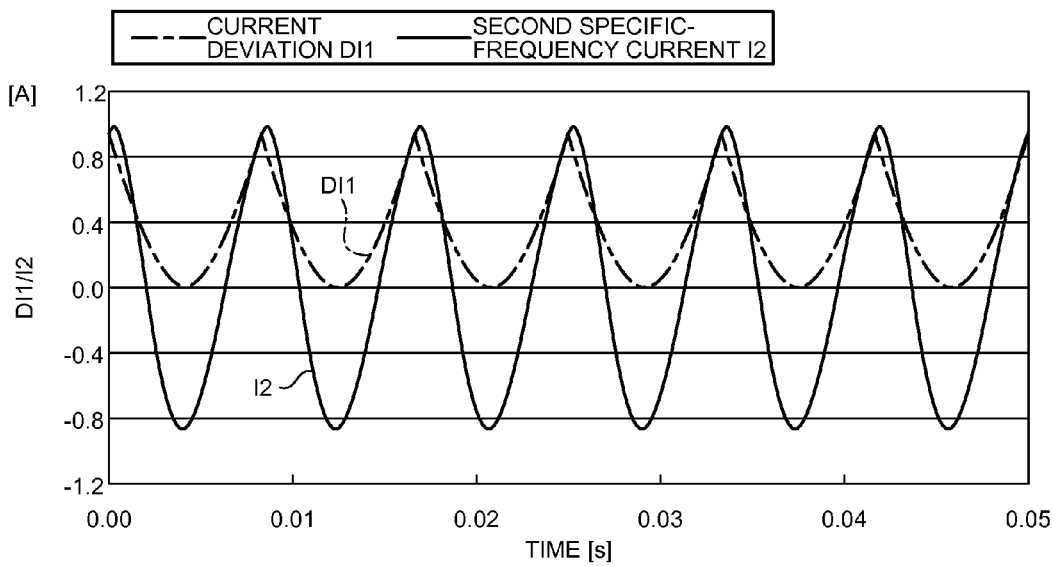
FIG. 4 shows respective waveforms of the current deviation DI1 and a second specific-frequency current I2 at the time of a balanced power failure.

A specific example of power failure detection according to the first embodiment is explained with reference to FIGS. 3 and 4. FIG. 3 shows respective waveforms of the main-transformer output current IS, the first specific-frequency current I1, and the current deviation DI1 at the time of a balanced power failure. FIG. 4 shows respective waveforms of the current deviation DI1 and the second specific-frequency current I2 at the time of a balanced power failure. In the following descriptions, an example in which the power running vehicle is an electric vehicle that performs AC-DC conversion by using a diode rectifier and runs by operating a DC electric motor, the regenerative vehicle is an AC electric vehicle mounted with the PWM converter, and the power source frequency of the AC overhead contact line 1 is 60 hertz is explained.

When the power source frequency of the AC overhead contact line 1 is 60 hertz, the first specific frequency set value Fset1 is set to 60 hertz, which is the power source frequency of the AC overhead contact line 1. When a balanced power failure occurs while the power running vehicle and the regenerative vehicle are running in the same substation section, as shown by a solid line in FIG. 3, the basic frequency of the main-transformer output current IS strains in a rectangular waveform of 60 hertz. Accordingly, by setting the first specific frequency set value Fset1 to 60 hertz being the power source frequency of the AC overhead contact line 1, when the main-transformer output current IS is input to the first specific-frequency-current computation unit 15a, as shown by a broken line in FIG. 3, the first specific-frequency current I1 substantially in a sinusoidal waveform of 60 hertz is output.

By subtracting the main-transformer output current IS from the first specific-frequency current I1, as shown by a one-dot chain line in FIG. 3, the current deviation DI1 has a waveform in which a peak is output with 120 hertz cycle being double frequency of the power source frequency of the AC overhead contact line 1. Accordingly, in this case, the second specific frequency set value Fset2 only needs to be set to 120 hertz, which is the frequency of the current deviation DI1. In this manner, by setting 120 hertz being the frequency of the current deviation DI1, that is, double frequency of the power source frequency of the AC overhead contact line 1 as the second specific frequency set value Fset2, when the current deviation DI1 is input to the second specific-frequency-current computation unit 15a, the second specific-frequency current I2 substantially in a sinusoidal waveform of 120 hertz is output to the power-failure detection unit 19a, as shown by a solid line in FIG. 4.

The power-failure detection unit 19a compares the size of the second specific-frequency current I2 with the size of the power-failure detection-current set value Iset. When the second specific-frequency current I2 is larger than the power-failure detection-current set value Iset, the power-failure detection unit 19a determines that a power failure has occurred, and outputs the power-failure detection signal TDN to the converter control unit 8. On the other hand, when the second specific-frequency current I2 is smaller than the power-failure detection-current set value Iset, the power-failure detection unit 19a determines that a power failure has not occurred, and does not output the power-failure detection signal TDN.

In this case, the power failure detector 13a shown in FIG. 2 compares the current output from the main transformer 3 (that is, the main-transformer output current IS) with the first specific frequency set value Fset1 to extract the first specific-frequency current I1, and subtracts the main-transformer output current IS, its own input, from the first specific-frequency current I1. Accordingly, the difference between an output at the time of a non-power failure and the output at the time of a power failure can be increased. That is, an output of the subtractor 16 (the current deviation DI1) decreases at the time of a non-power failure, and the output of the subtractor 16 (the current deviation DI1) increases at the time of a power failure. Further, at the time of a power failure, the increased current deviation DI1 is compared with the second specific frequency set value Fset2 set to the particular frequency generated at the time of a balanced power failure (in this example, 120 hertz that is double the frequency of the power source frequency of the AC overhead contact line 1) to extract the second specific-frequency current I2. The second specific-frequency current I2 is compared with the power-failure detection-current set value Iset to perform power failure detection. Therefore, because the power-failure detection-current set value Iset, which is a threshold for power failure detection, can be set large, the detection sensitivity and detection accuracy of a power failure having a small current fluctuation range of the AC overhead contact line 1 such as the balanced power failure can be improved.

Furthermore, in the conventional examples explained as the background technique of the present embodiment, if the current deviation takes a large value sporadically due to a disturbance other than a power failure, erroneous detection occurs. However, in the present embodiment, the second specific frequency set value Fset2 is set, for example, to a particular frequency generated at the time of a balanced power failure (for example, when the power source frequency of the AC overhead contact line 1 is 60 hertz, 120 hertz that is double the frequency thereof). Because of this, even if the current deviation takes a large value sporadically due to a disturbance other than the power failure, the disturbance component is attenuated by the second specific-frequency-current computation unit 15a. Accordingly, erroneous detection due to a disturbance other than the power failure can be prevented.

As explained above, according to the controller of the AC electric vehicle of the first embodiment, the main-transformer output current output from the main transformer is compared with the first specific frequency set value to extract the first specific-frequency current, and the main-transformer output current being its own input is subtracted from the first specific-frequency current. Accordingly, an output difference between at the time of a non-power failure and at the time of a power failure can be increased. Further, at the time of a power failure, the increased current deviation is compared with the second specific frequency set value set to the particular frequency generated at the time of a balanced power failure to extract the second specific-frequency current, and the second specific-frequency current is compared with the power-failure detection-current set value to perform power failure detection. Therefore, the power-failure detection-current set value being the threshold for power failure detection can be set large, and the detection sensitivity and detection accuracy of a power failure having a small current fluctuation range of the AC overhead contact line such as the balanced power failure can be improved.

Furthermore, by setting the second specific frequency set value to a particular frequency generated at the time of, for example, the balanced power failure, even if the current deviation takes a large value sporadically due to a disturbance other than the power failure, the disturbance component is attenuated by the second specific-frequency-current computation unit. Accordingly, erroneous detection due to a disturbance other than the power failure can be prevented.

As a result, erroneous detection and power failure detection delay at the time of normal operation can be prevented, while increasing the power failure detection sensitivity more than that in conventional techniques. When a power failure has been detected, the operation of the PWM converter is stopped, and the regenerative braking operation of the electric vehicle that is receiving supply of power from the AC overhead contact line is stopped. Accordingly, the AC power flowing through the AC overhead contact line decreases, and power failure detection in the substation can be performed promptly and reliably. In this way, control that satisfies both improvement of the power failure detection sensitivity and improvement of the power failure detection accuracy can be realized. Moreover, prevention of failures in the ground facility such as the substation and stabilization of vehicle operation can be realized.

Second Embodiment

In the first embodiment, an example in which power failure detection is performed by using the main-transformer output current IS output from the main transformer 3 has been explained. Meanwhile, in a second embodiment of the present invention, an example in which power failure detection is performed by using an output voltage (a main-transformer output voltage) VS of the main transformer 3 is explained.

Figure 5:
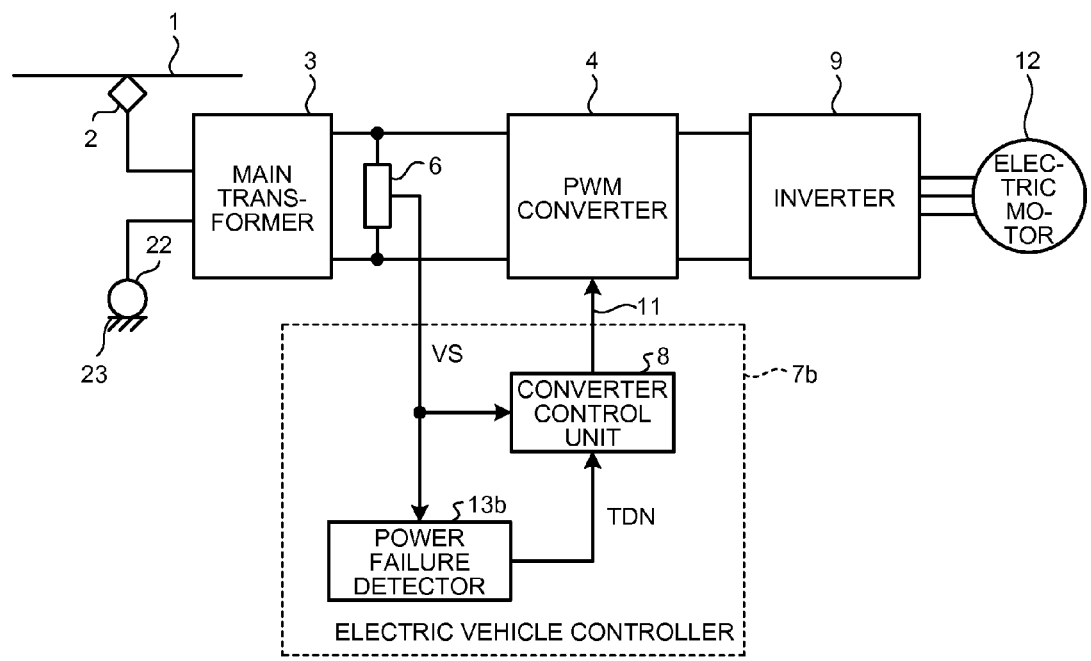
FIG. 5 shows a configuration example of a drive system and a control system of an AC electric vehicle according to a second embodiment.

FIG. 5 shows a configuration example of a drive system and a control system of an AC electric vehicle according to the second embodiment. Because configurations of a drive system of an AC electric vehicle according to the second embodiment are identical to those of the drive system of the AC electric vehicle according to the first embodiment, explanations thereof will be omitted.

Meanwhile, the control system of the AC electric vehicle is configured to include a voltage detector 6 that detects an output voltage of the main transformer 3 and an electric vehicle controller 7b that controls the PWM converter 4 based on the main-transformer output voltage VS being an output of the voltage detector 6, instead of the current detector 5 and the electric vehicle controller 7a in the configuration of the first embodiment shown in FIG. 1. The electric vehicle controller 7b includes a power failure detector 13b instead of the power failure detector 13a in the configuration of the first embodiment shown in FIG. 1, and is configured so that the main-transformer output voltage VS is input to both the converter control unit 8 and the power failure detector 13b.

When a power failure of the AC overhead contact line 1 has occurred, the power-failure detection signal TDN is output from the power failure detector 13b to the converter control unit 8. In the present embodiment, the power-failure detection signal TDN is generated by using the main-transformer output voltage VS detected by the voltage detector 6. The converter control unit 8 completely stops the output of the gate enable signal 11 based on the input power-failure detection signal TDN.

Figure 6:
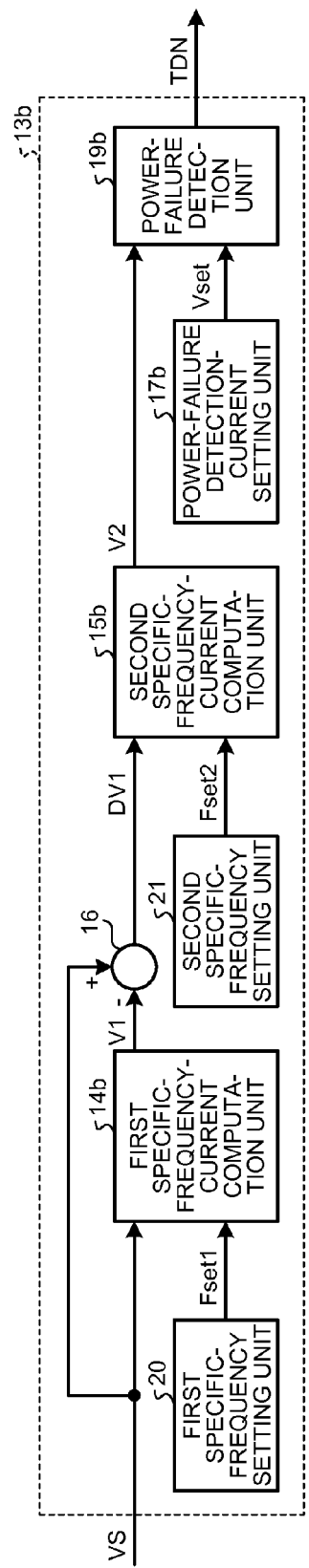
FIG. 6 shows an example of a detailed configuration of a power failure detector according to the second embodiment.

The configuration of the power failure detector 13b according to the first embodiment is explained next. FIG. 6 shows an example of a detailed configuration of the power failure detector according to the second embodiment. Constituent elements in the present embodiment that are identical or equivalent to those of the first embodiment are denoted by like reference signs and explanations thereof will be omitted.

In FIG. 6, the power failure detector 13b includes a power-failure detection-voltage setting unit 17b that outputs a power-failure detection-voltage set value Vset, which is a threshold for determining a power failure by a voltage value level, a first specific-frequency-voltage computation unit 14b that receives the main-transformer output voltage VS and the first specific frequency set value Fset1 as an input, a second specific-frequency-voltage computation unit 15b that receives a voltage deviation DV1 being an output of the subtractor 16 and the second specific frequency set value Fset2 as an input, and a power-failure detection unit 19b that receives the power-failure detection-voltage set value Vset and a second specific-frequency voltage V2 being an output of the second specific-frequency-voltage computation unit 15b as an input, instead of the power-failure detection-voltage setting unit 17a, the first specific-frequency-current computation unit 14a, the second specific-frequency-current computation unit 15a, and the power-failure detection unit 19a in the configuration of the first embodiment shown in FIG. 2. An output of the power-failure detection unit 19b is output as the power-failure detection signal TDN.

The first specific frequency set value Fset1 output by the first specific-frequency setting unit 20, the second specific frequency set value Fset2 output by the second specific-frequency setting unit 21, and the power-failure detection-voltage set value Vset output by the power-failure detection-voltage setting unit 17b can be set to an arbitrary value respectively, as in the first embodiment, according to the usable frequency in the feeding facility such as the substation, that is, the power source frequency and supplied power of the AC overhead contact line 1, the number of vehicles in the formation to be operated simultaneously, the train formation type, and the like. The power source frequency of the AC overhead contact line 1 (for example, 60 hertz) only needs to be set as the first specific frequency set value Fset1, and a particular frequency generated at the time of a balanced power failure (for example, 120 hertz being double frequency of the power source frequency of the AC overhead contact line 1) only needs to be set as the second specific frequency set value Fset2, and a different value can be set to the main-transformer output voltage VS or the voltage deviation DV1.

As the first specific-frequency-voltage computation unit 14b and the second specific-frequency-voltage computation unit 15b, as an example thereof, a bandpass filter respectively using the first specific frequency set value Fset1 and the second specific frequency set value Fset2 as a central frequency can be considered as in the first embodiment.

(Operation of Power Failure Detector)

The operation of the power failure detector 13b is explained with reference to FIGS. 1 and 2. The first specific-frequency-voltage computation unit 14b extracts a voltage component corresponding to the first specific frequency set value Fset1 from the main-transformer output voltage VS output from the voltage detector 6, and outputs the voltage component to the subtractor 16 as the first specific-frequency voltage V1. The subtractor 16 subtracts the first specific-frequency voltage V1 from the main-transformer output voltage VS, and outputs a subtraction result to the second specific-frequency-voltage computation unit 15b as the voltage deviation DV1. The second specific-frequency-voltage computation unit 15b extracts a voltage component corresponding to the second specific frequency set value Fset2 from the voltage deviation DV1, and outputs the voltage component to the power-failure detection unit 19b as the second specific-frequency voltage V2.

The power-failure detection unit 19b compares the size of the second specific-frequency voltage V2 with the size of the power-failure detection-voltage set value Vset. When the second specific-frequency voltage V2 is larger than the power-failure detection-voltage set value Vset, the power-failure detection unit 19b determines that a power failure has occurred, and outputs the power-failure detection signal TDN to the converter control unit 8. On the other hand, when the second specific-frequency voltage V2 is smaller than the power-failure detection-voltage set value Vset, the power-failure detection unit 19b determines that a power failure has not occurred, and does not output the power-failure detection signal TDN.

The power failure detector 13b shown in FIG. 6 compares a voltage output from the main transformer 3 (that is, the main-transformer output voltage VS) with the first specific frequency set value Fset1 to extract the first specific-frequency voltage V1, and subtracts the main-transformer output voltage VS being its own input from the first specific-frequency voltage V1. Accordingly, an output difference between at the time of a non-power failure and at the time of a power failure can be increased. That is, an output of the subtractor 16 (the voltage deviation DV1) decreases at the time of a non-power failure, and the output of the subtractor 16 (the voltage deviation DV1) increases at the time of a power failure. Furthermore, at the time of a power failure, the increased voltage deviation DV1 is compared with the second specific frequency set value Fset2 set to the particular frequency generated at the time of a balanced power failure (in this case, 120 hertz being the double frequency of the power source frequency of the AC overhead contact line 1) to extract the second specific-frequency voltage V2, and the second specific-frequency voltage V2 is compared with the power-failure detection-voltage set value Vset to perform power failure detection. Therefore, because the power-failure detection-voltage set value Vset, which is the threshold for power failure detection, can be set large, and the detection sensitivity and detection accuracy of a power failure having a small voltage fluctuation range of the AC overhead contact line 1 such as the balanced power failure can be improved, as in the first embodiment.

Also in the present embodiment, by setting the second specific frequency set value Fset2, for example, to the particular frequency generated at the time of a balanced power failure (for example, when the power source frequency of the AC overhead contact line 1 is set to 60 hertz, 120 hertz being the double frequency thereof), even if the voltage deviation DV1 takes a large value sporadically due to a disturbance other than the power failure, the disturbance component is attenuated by the second specific-frequency-voltage computation unit 15b. Accordingly, erroneous detection due to a disturbance other than the power failure can be prevented.

As explained above, according to the controller of the AC electric vehicle of the second embodiment, even in a configuration in which power failure detection is performed by using the main-transformer output voltage output from the main transformer, the main-transformer output voltage output from the main transformer is compared with the first specific frequency set value to extract the first specific-frequency voltage, and the main-transformer output voltage being its own input is subtracted from the first specific-frequency voltage. Accordingly, an output difference between at the time of a non-power failure and at the time of a power failure can be increased. Furthermore, at the time of a power failure, the increased voltage deviation is compared with the second specific frequency set value set to the particular frequency generated at the time of a balanced power failure to extract the second specific-frequency voltage, and the second specific-frequency voltage is compared with the power-failure detection-voltage set value to perform power failure detection. Therefore, the power-failure detection-voltage set value being the threshold for power failure detection can be set large, and the detection sensitivity and detection accuracy of a power failure having a small voltage fluctuation range of the AC overhead contact line such as the balanced power failure can be improved.

Furthermore, by setting the second specific frequency set value to the particular frequency generated at the time of, for example, the balanced power failure, even if the current deviation takes a large value sporadically due to a disturbance other than the power failure, the disturbance component is attenuated by the second specific-frequency-voltage computation unit. Accordingly, erroneous detection due to a disturbance other than the power failure can be prevented.

As a result, erroneous detection and power failure detection delay due to a disturbance other than the power failure at the time of normal operation can be prevented, while increasing the power failure detection sensitivity as compared to that in conventional techniques. When a power failure has been detected, the operation of the PWM converter is stopped, and the regenerative braking operation of the electric vehicle that is receiving supply of power from the AC overhead contact line is stopped. Accordingly, the AC power flowing to the AC overhead contact line decreases, and power failure detection in the substation can be performed promptly and reliably. In this manner, control that satisfies both of improvement of the power failure detection sensitivity and improvement of the power failure detection accuracy can be realized, and prevention of failures in the ground facility such as the substation and stabilization of vehicle operation can be realized.

In the embodiments described above, an example in which the first specific frequency set value is set to 60 hertz, assuming that the power source frequency of the AC overhead contact line is 60 hertz, and the second specific frequency set value is set to 120 hertz, assuming that the particular frequency generated at the time of a balanced power failure is 120 hertz being the double frequency of the power source frequency of the AC overhead contact line has been explained. However, these first specific frequency set value and second specific frequency set value are not limited to the example explained above, and the present invention is not limited by the first specific frequency set value and the second specific frequency set value.

For example, when the first specific frequency set value is set to 50 hertz, assuming that the power source frequency of the AC overhead contact line is 50 hertz, the second specific frequency set value only needs to be set to 100 hertz. Generally, the waveform of the current deviation or voltage deviation at the time of occurrence of the balanced power failure has a peak at a frequency n times (n is an integer equal to or larger than 2) the power source frequency of the AC overhead contact line. Therefore, the second specific frequency set value can be set to a frequency n times the power source frequency of the AC overhead contact line.

Further, in the embodiments described above, an example in which power failure detection using the main-transformer output current and power failure detection using the main-transformer output voltage are realized by a different configuration has been explained. However, needless to mention, the configuration can be such that power failure detection is performed by using both the main-transformer output current and the main-transformer output voltage. In this case, the power failure detection unit only needs to determine that there is a power failure when the second specific-frequency current is larger than the power-failure detection-current set value or the second specific-frequency voltage is larger than the power-failure detection-voltage set value, and output a power-failure detection signal to the converter control unit, and determine that there is no power failure when the second specific-frequency current is smaller than the power-failure detection-current set value and the second specific-frequency voltage is smaller than the power-failure detection-voltage set value.

The configuration described in the above embodiments is only an example of the contents of the present invention. The configuration can be combined with other well-known techniques, and it is needless to mention that the present invention can be configured while modifying it without departing from the scope of the invention, such as omitting a part of the configuration.

REFERENCE SIGNS LIST

1 AC overhead contact line
2 pantograph
3 main transformer

4 PWM converter
5 current detector
6 voltage detector
7a, 7b electric vehicle controller
8 converter control unit
9 inverter
11 gate enable signal
12 electric motor
13a, 13b power failure detector
14a first specific-frequency-current computation unit
14b first specific-frequency-voltage computation unit
15a second specific-frequency-current computation unit
15b second specific-frequency-voltage computation unit
16 subtractor
17a power-failure detection-current setting unit
17b power-failure detection-voltage setting unit
19a, 19b power-failure detection unit
20 first specific-frequency setting unit
21 second specific-frequency setting unit
22 wheel
23 rail

The invention claimed is:

1. A controller of an AC electric vehicle comprising: a transformer that receives an AC voltage from an AC overhead contact line;
a converter that converts an AC voltage output from the transformer to a DC voltage;
an inverter that converts the DC voltage from the converter to an AC voltage and outputs the AC voltage to an AC electric motor;
a current detector that detects an output current from the transformer; and
a control unit including a converter control unit that controls an output of the converter according to a gate enable signal based on a detection current detected by the current detector and a power failure detector that detects a power failure generated in the AC overhead contact line based on the detection current,
wherein the power failure detector includes: corresponding to a predetermined first specific frequency set value from the detection current and outputs the extracted current component as a first specific-frequency current;
a subtractor that subtracts the first specific-frequency current from the detection current and outputs a subtraction result as a current deviation;
a second specific-frequency-current computation unit that extracts a current component corresponding to a predetermined second specific frequency set value from the current deviation and outputs the extracted current component as a second specific-frequency current; and
a power failure detector unit that compares the second specific-frequency current with a predetermined power-failure detection-current set value, and outputs a power-failure detection signal when the second specific-frequency current is larger than the power-failure detection-current set value, and
wherein the converter control unit stops an operation of the converter by stopping the gate enable signal based on an input power-failure detection signal.

2. A controller of an AC electric vehicle comprising: a transformer that receives an AC voltage from an AC overhead contact line;
a converter that converts an AC voltage output from the transformer to a DC voltage; an inverter that converts the DC voltage from the converter to an AC voltage and outputs the AC voltage to an AC electric motor;
a control unit including a converter control unit that controls an output of the converter according to a gate enable signal based on a detection voltage detected by the voltage detector and a power failure detector that detects a power failure generated in the AC overhead contact line based on the detection voltage,
wherein the power failure detector includes:
a first specific-frequency-voltage computation unit that extracts a voltage component corresponding to a predetermined first specific frequency set value from the detection voltage and outputs the extracted voltage component as a first specific-frequency voltage;
a subtractor that subtracts the first specific-frequency voltage from the detection voltage and outputs a subtraction result as a voltage deviation;
a second specific-frequency-voltage computation unit that extracts a voltage component corresponding to a predetermined second specific frequency set value from the voltage and
a power failure detector unit that compares the second specific-frequency voltage with a predetermined power-failure detection-voltage set value, and outputs a power-failure detection signal when the second specific-frequency voltage is larger than the power-failure detection-voltage set value, and
wherein the converter control unit stops an operation of the converter by stopping the gate enable signal based on an input power-failure detection signal.

3. The controller of an AC electric vehicle according to claim 1, wherein the power detector is configured to be able to change the first specific frequency set value, the second specific frequency set value, and the power-failure detection-current set vaine.

4. The controller of an AC electric vehicle according to claim 1, wherein the power failure detector is configured so that the second specific frequency set value has a larger value than the first specific frequency set value.

5. The controller of an AC electric vehicle according to claim 1, wherein the power failure detector is configured so that the second specific frequency set value has a value twice the first specific frequency set value.

6. The controller of an AC electric vehicle according to claim 1, wherein the power failure detector is configured so that the second specific frequency set value has a value n times (where n is an integer equal to or larger than 2) the first specific frequency set value.

7. The controller of an AC electric vehicle according to claim 2, wherein the power failure detector is configured to be able to change the first specific frequency set value, the second specific frequency set value, and the power-failure detection-voltage set value.

8. The controller of an AC electric vehicle according to claim 2, wherein the power failure detector is configured so that the second specific frequency set value has a larger value than the first specific frequency set value.

9. The controller of an AC electric vehicle according to claim 2, wherein the power failure detector is configured so that the second specific frequency set value has a value twice the first specific frequency set value.

10. The controller of an AC electric vehicle according to claim 2, wherein the power failure detector is configured so that the second specific frequency set value has a value n times (where n is an integer equal to or larger than 2) the first specific frequency set value.

* * * * *